M. J. McMARTIN.
CORRUGATED PIPE CONSTRUCTION.
APPLICATION FILED MAR. 20, 1909.
1,076,595.
Patented Oct. 21, 1913.
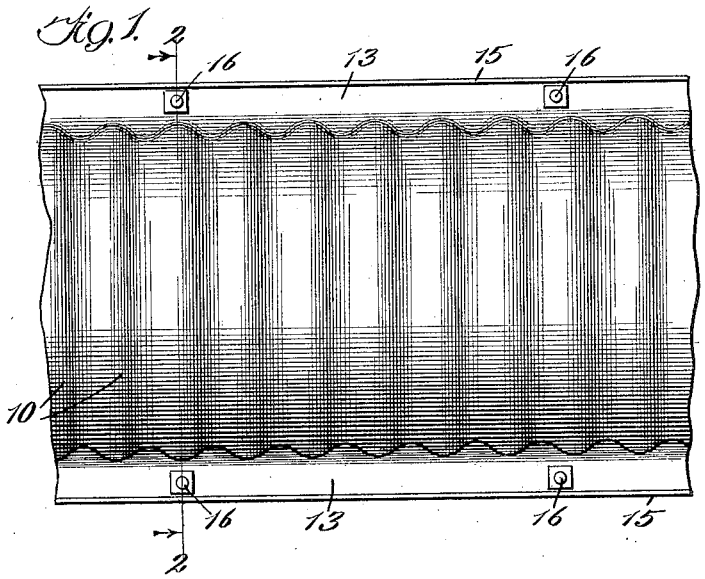
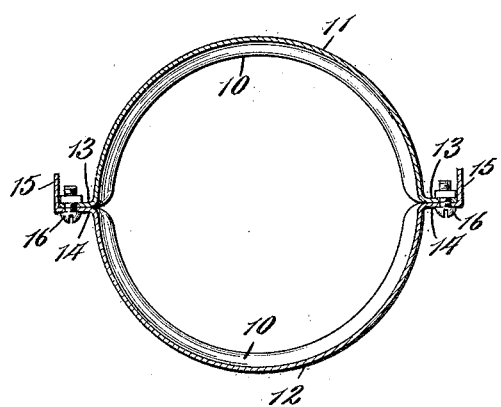
Witnesses:
Inventor:
Malcolm J. McMartin

UNITED STATES PATENT OFFICE.

MALCOLM J. McMARTIN, OF DULUTH, MINNESOTA, ASSIGNOR TO DULUTH CORRUGATING & ROOFING COMPANY, OF DULUTH, MINNESOTA, A CORPORATION OF MINNESOTA.

CORRUGATED-PIPE CONSTRUCTION.

1,076,595.

Specification of Letters Patent.   Patented Oct. 21, 1913.

Application filed March 20, 1909.   Serial No. 484,760.

*To all whom it may concern:*

Be it known that I, MALCOLM J. McMARTIN, a citizen of the United States, and residing at Duluth, in the county of St. Louis and State of Minnesota, have invented certain new and useful Improvements in Corrugated-Pipe Construction, of which the following is a specification.

This invention relates to improvements in corrugated pipes and the primary object of the same is to provide an improved sectional pipe having transverse ribs or corrugations, and improved means for joining and securing the sections together.

A further object is to provide an improved device of this character which will be simple, durable and cheap in construction, effective and efficient in operation, and in which the sections may be readily nested for shipping purposes.

To the attainment of these ends and the accomplishment of other new and useful objects as will appear, the invention consists in the features of novelty in the construction, combination and arrangement of the several parts hereinafter more fully described and claimed and shown in the accompanying drawing, illustrating the embodiment of the invention and in which—

Figure 1 is a plan view of a section of pipe constructed in accordance with the principles of this invention. Fig. 2 is a transverse sectional view on line 2—2 of Fig. 1.

Referring more particularly to the drawing and in the present exemplification of the invention the pipe is provided with transverse ribs or corrugations 10 and is divided longitudinally to form two semi-circular sections. One of the sections 11 is provided with laterally projecting flanges 13 along the edges thereof which flanges extend longitudinally of the section and may be of any desired width. The other section 12 of the pipe is provided with laterally projecting flanges 14 arranged along the edges and extending longitudinally of the sections, and these flanges 13, 14, are adapted to engage and rest flat against each other when the pipe sections are assembled. The flanges on one of the sections, preferably the flanges 14 on the section 12, are deflected as at 15 along their edges to form portions arranged at substantially right angles to the flanges and these deflected portions 15 are adapted to engage the edges of the respective adjacent flanges 13 on the pipe section 11 and project beyond the faces of the flanges 13. Suitable fastening devices 16, such as bolts or the like, are provided for securing the pipe sections together and these fastening devices pass through the flanges 13 and 14, between the periphery of the pipe section and the respective adjacent deflected portion 15 of the flange.

With this improved construction it will be apparent that the deflected portions or flanges 15 coöperate with the connecting joint and serve to relieve the fastening devices 16 of any shearing strain and at the same time will permit the fastening devices to be readily removed to disconnect the pipe sections for shipment purposes. After the sections have been disconnected they may be readily nested. Furthermore with this improved pipe having transverse ribs or corrugations and the sections being secured together by the flanges extending longitudinally of the sections and along the edges thereof, a pipe of very great strength and durability will be obtained.

What is claimed as new is—

1. A pipe having transverse corrugations and divided longitudinally into two sections, each of said sections being provided with flanges projecting laterally beyond the edges thereof and extending longitudinally of the sections, the flanges of one section resting flat against the respective flanges of the other section, the flanges on one section having their edges deflected at angles to their body portions to engage the edges of the respective flanges on the other section, and fastening devices passing through the flanges.

2. A pipe having transverse corrugations and divided longitudinally into two sections, each of said sections being provided with flanges projecting laterally beyond the edges thereof and extending longitudinally of the sections, the flanges of one section resting flat against the respective flanges of the other section, the flanges on one section having their edges deflected at angles to their body portions to engage the edges of the respective flanges on the other section and to project beyond the face of the last said flanges, and fastening devices removably passing through the flanges between the periphery of the pipe sections and the respective deflected edge of the flanges.

In testimony whereof I have signed my name to this specification, in the presence of two subscribing witnesses, on this 11th day of February A. D. 1909.

MALCOLM J. McMARTIN.

Witnesses:
M. M. NELSON,
H. A. McMARTIN.